United States Patent
Onogawa et al.

(10) Patent No.: US 7,204,643 B2
(45) Date of Patent: Apr. 17, 2007

(54) METHOD OF PRODUCING A RECEPTACLE-TYPE OPTICAL CONNECTOR

(75) Inventors: Akihiro Onogawa, Tokyo (JP); Toshifumi Takagi, Tokyo (JP); Yasutaka Hiroki, Tokyo (JP); Hirotada Kobayashi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/500,110

(22) Filed: Aug. 7, 2006

(65) Prior Publication Data

US 2006/0269193 A1 Nov. 30, 2006

Related U.S. Application Data

(62) Division of application No. 10/953,210, filed on Sep. 29, 2004, now Pat. No. 7,118,282.

(30) Foreign Application Priority Data

Sep. 30, 2003 (JP) .............................. 2003-339726

(51) Int. Cl.
*G02B 6/36* (2006.01)

(52) U.S. Cl. .......................................... 385/53; 385/88

(58) Field of Classification Search ................... 385/53
See application file for complete search history.

(56) References Cited

U.S. PATENT DOCUMENTS

| 6,361,218 B1 | 3/2002 | Matasek et al. |
| 2003/0180004 A1 | 9/2003 | Cox et al. |

FOREIGN PATENT DOCUMENTS

| JP | 2001-183549 A | 7/2001 |
| JP | 3424172 B2 | 5/2003 |

*Primary Examiner*—Frank G. Font
*Assistant Examiner*—Mary El-Shammaa
(74) *Attorney, Agent, or Firm*—Frishauf, Holtz, Goodman & Chick, P.C.

(57) ABSTRACT

In a receptacle-type optical connector to be connected to a plug-type optical connector connected to an optical fiber terminated by the use of a ferrule, use is made of a base shell, a front shell, and an intermediate shell which is interposed between the base shell and the front shell. The base shell has a core coupling portion for coupling a core of the optical fiber. The front shell has an opening which is shaped in conformity with a plug shape of the plug-type optical connector. The intermediate shell is partly fitted to the base shell. The intermediate shell has a cylindrical protrusion which is shaped in conformity with the ferrule and which is inserted into the opening.

4 Claims, 3 Drawing Sheets

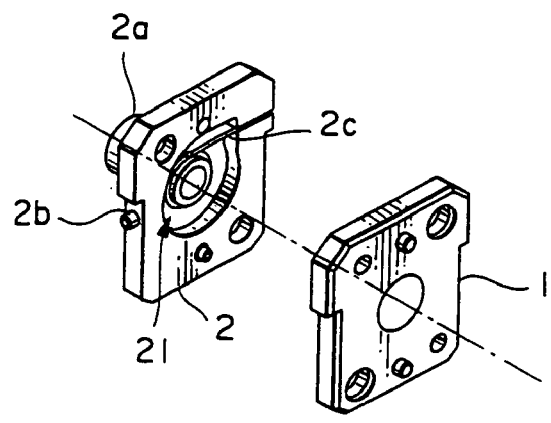
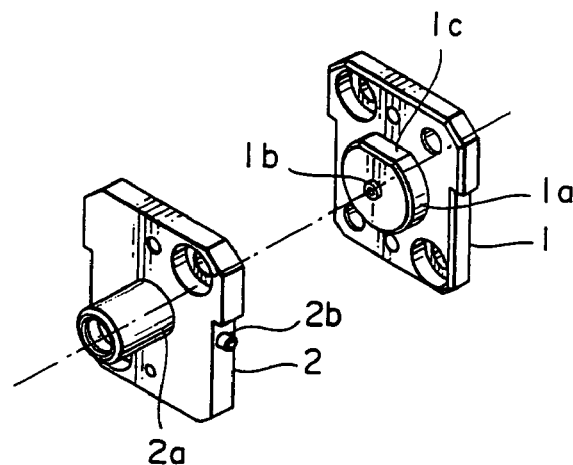
FIG. 2A          FIG. 2B
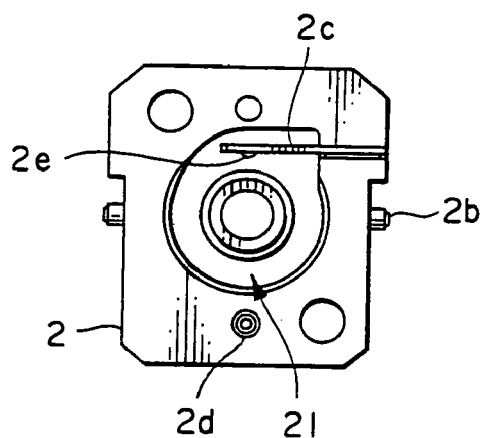
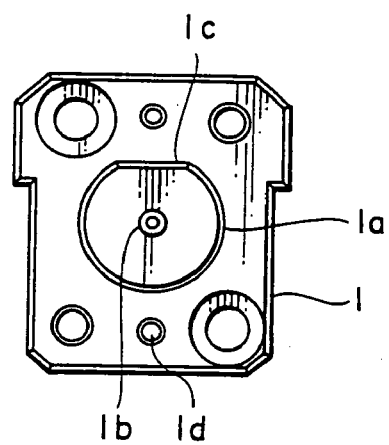
FIG. 3          FIG. 4

METHOD OF PRODUCING A RECEPTACLE-TYPE OPTICAL CONNECTOR

The present application is a Divisional Application of U.S. patent application Ser. No. 10/953,210, filed Sep. 29, 2004 now U.S. Pat. No. 7,118,282 and claims the benefit of priority of Japanese patent application JP 2003-339726, the entire contents of which are incorporated herein by reference.

BACKGROUND OF THE INVENTION

This invention relates to a receptacle-type optical connector adapted to be mounted to various kinds of apparatuses in the field of optical communication.

For example, Japanese Patent (JP-B) No. 3424172 (corresp. to U.S. Pat. No. 6,361,218 B1) discloses an optical connector module comprising a plug-type optical connector and a receptacle-type optical connector coupled with each other. For example, Japanese Patent Application Publication (JP-A) No. 2001-183549 discloses an optical connector in which an optical connection loss is reduced by suppressing displacement or misalignment of a ferule inserted into a sleeve.

As one of important features of an optical apparatus, an optical fiber connected to the apparatus and light emitting and light receiving elements in the apparatus must be arranged without axial displacement or misalignment therebetween so that optical energy can be coupled and transmitted without a connection loss. Therefore, a positional relationship between the optical fiber and the light emitting and the light receiving elements upon coupling is required to be reproducible with high accuracy.

The plug-type optical connector may use a ferrule having a relatively large diameter (for example, 2.5 mm) and a ferrule having a relatively small diameter (for example, 1.25 mm) intended to achieve space saving. In this connection, the receptacle-type optical connector is also required to be adapted to those ferrules different in diameter.

SUMMARY OF THE INVENTION

It is therefore an object of the present invention to provide a receptacle-type optical connector easily adaptable to various specifications of a plug-type optical connector as a mating object.

It is another object of the present invention to provide a method of producing the above-mentioned receptacle-type optical connector.

Other objects of the present invention will become clear as the description proceeds.

According to an aspect of the present invention, there is provided a receptacle-type optical connector to be connected to a plug-type optical connector connected to an optical fiber terminated by the use of a ferrule, the receptacle-type optical connector comprising, a base shell having a core coupling portion for coupling a core of the optical fiber, a front shell having an opening which is shaped in conformity with a plug shape of the plug-type optical connector, and an intermediate shell interposed between the base shell and the front shell and partly fitted to the base shell, the intermediate shell having a cylindrical protrusion which is shaped in conformity with the ferrule and which is inserted into the opening.

According to another aspect of the present invention, there is provided a method of producing a receptacle-type optical connector to be connected to a plug-type optical connector connected to an optical fiber, the method comprising the steps of preparing a base shell having a core coupling portion for coupling a core of the optical fiber, preparing a first intermediate shell having a cylindrical protrusion shaped in conformity with a fist ferrule having a first dimension and used in termination of the optical fiber, preparing a second intermediate shell having a cylindrical protrusion shaped in conformity with a second ferrule having a second dimension and used in termination of the optical fiber, preparing a first front shell having an opening shaped in conformity with a first plug shape of the plug-type optical connector, preparing a second front shell having an opening shaped in conformity with a second plug shape of the plug-type optical connector, selecting, as a selected intermediate shell, one from an intermediate shell group including the first and the second intermediate shells with reference to the dimension of a ferrule which is used in the optical fiber connected to the plug-type optical connector, selecting, as a selected front shell, one from a front shell group including the first and the second front shells with reference to a plug shape of the plug-type optical connector to be connected to the receptacle-type optical connector, interposing the selected intermediate shell between the base shell and the selected front shell and inserting the cylindrical protrusion into the opening, and fixing the base shell, the selected front shell, and the selected intermediate shell to one another.

According to a still another aspect of the present invention, there is provided a method of producing a receptacle-type optical connector to be connected to a plug-type optical connector connected to an optical fiber, the method comprising the steps of preparing a base shell having a core coupling portion for coupling a core of the optical fiber, preparing a plurality of types of intermediate shells having cylindrical protrusions different in diameter from one another, preparing a plurality of types of front shells having openings different in shape from one another, selecting one of the intermediate shells as a selected intermediate shell with reference to a dimension of a ferrule which is used in the optical fiber, selecting one of the front shells as a selected front shell with reference to a plug shape of the plug-type optical, interposing the selected intermediate shell between the base shell and the selected front shell and inserting the cylindrical protrusion into the opening, and fixing the base shell, the selected front shell, and the selected intermediate shell to one another.

BRIEF DESCRIPTION OF THE DRAWING

FIG. 2A is an exploded rear perspective view of a base shell and an intermediate shell of the receptacle-type optical connector illustrated in FIG. 1;

FIG. 2B is an exploded front perspective view of the base shall and the intermediate shell illustrated in FIG. 2A;

FIG. 3 is a rear view of the intermediate shell;

FIG. 4 is a front view of the base shell;

DESCRIPTION OF THE PREFERRED EMBODIMENT

Figure 1:
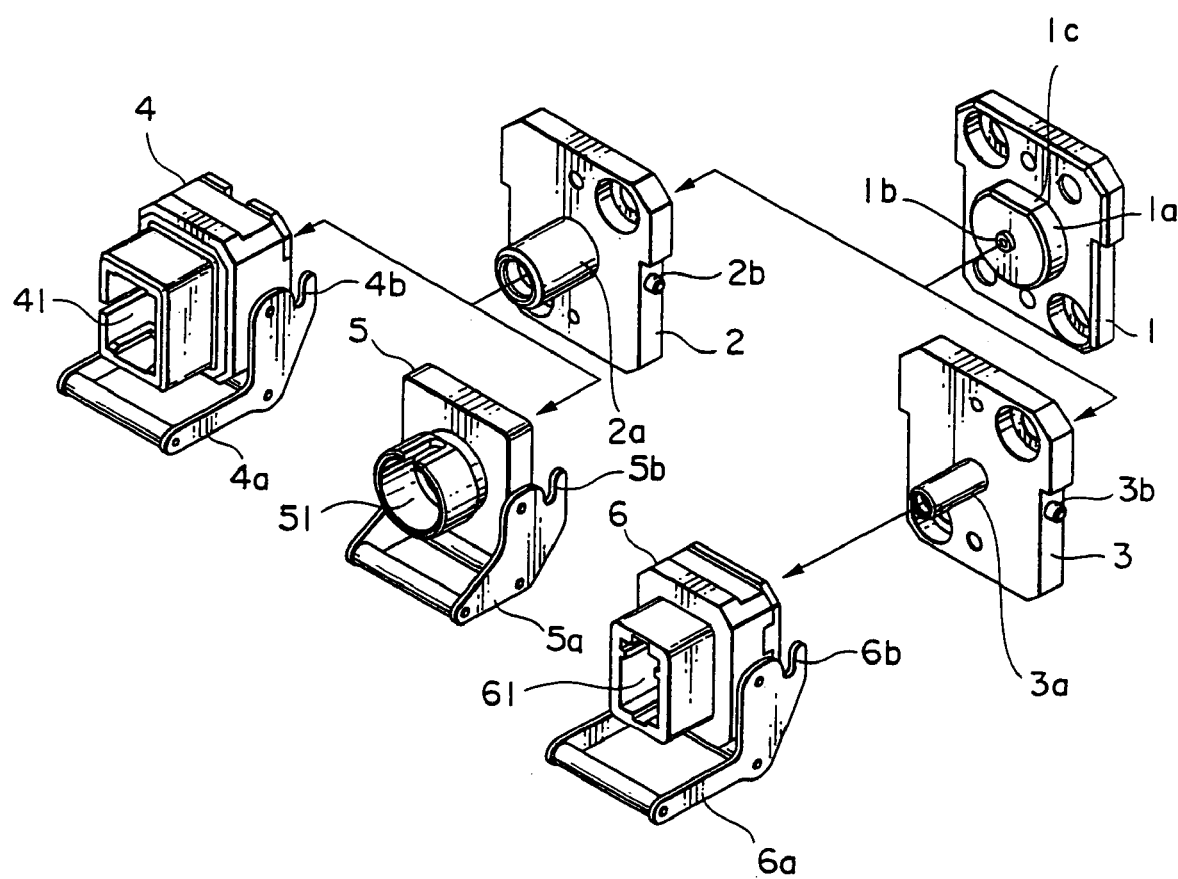
FIG. 1 is an exploded perspective view showing a basic structure of a receptacle-type optical connector according to an embodiment of the present invention.

Referring to FIG. 1, description will be made of a basic structure of a receptacle-type optical connector according to an embodiment of the present invention.

FIG. 1 shows a plurality of components including a single kind of base shell 1, two different types of intermediate shells 2 and 3, and three different types of front shells 4, 5, and 6. By appropriately selecting and using some of these components, the receptacle-type optical connector is produced. Specifically, the receptacle-type optical connector comprises the base shell 1, a selected one of the two different types of intermediate shells 2 and 3 (which will hereinafter be called a "selected intermediate shell"), and a selected one of the three different types of front shells 4, 5, and 6 (which will hereinafter be called a "selected front shell"). The receptacle-type optical connector is assembled so that the selected intermediate shell is interposed between the base shell 1 and the selected front shell.

A first example of the receptacle-type optical connector is assembled using the base shell 1 fixed to an optical communication apparatus, the intermediate shell 2, and the front shell 4. A second example of the receptacle-type optical connector is assembled using the base shell 1, the intermediate shell 2, and the front shell 5. A third example of the receptacle-type optical connector is assembled using the base shell 1, the intermediate shell 3, and the front shell 6.

The receptacle-type optical connector thus assembled is coupled with a plug-type optical connector (not shown) as a mating object. An optical fiber (not shown) connected to the plug-type connector is terminated by the use of a ferrule as well known in the art. As the ferrule, a relatively-large-diameter ferrule having an outer diameter of 2.5 mm and a relatively-small-diameter ferrule having an outer diameter of 1.25 mm are selectively used. In the following, the plug-type optical connector may be called a connector plug.

In order to produce the receptacle-type optical connector, the base shell 1 is used as a common component and, therefore, only a single kind of base shell is provided. The intermediate shell 2 has a cylindrical protrusion 2a formed at its center to protrude forward and a pin 2b formed on its side surface to protrude laterally outward. The cylindrical protrusion 2a has a dimension corresponding to the relatively-large-diameter ferrule. The intermediate shell 3 has a cylindrical protrusion 3a formed at its center to protrude forward and a pin 3b formed on its side surface to protrude laterally outward. The cylindrical protrusion 3a has a dimension corresponding to the relatively-small-diameter ferrule. The front shell 4 has an opening 41 which is shaped in conformity with a peripheral shape of a SC-type connector plug adapted to the cylindrical protrusion 2a and which allows the cylindrical protrusion 2a to be inserted therein. The front shell 5 has an opening 51 which is shaped in conformity with a peripheral shape of a FS-type connector plug adapted to the cylindrical protrusion 2a and which allows the cylindrical protrusion 2a to be inserted therein. The front shell 6 has an opening 61 which is shaped in conformity with a peripheral shape of a SC-type connector plug adapted to the cylindrical protrusion 3a and which allows the cylindrical protrusion 3a to be inserted therein. The front shells 4, 5, and 6 are provided with rotatable levers 4a, 5a, and 6a, respectively. The levers 4a, 5a, and 6a are provided with grooves 4b, 5b, and 6b, respectively.

An assembling process of the receptacle-type optical connector will be described. With reference to the dimension of the ferrule of the plug-type connector as the mating object, one of the intermediate shells 2 and 3 is selected as the selected intermediate shell. The base shell 1 is fitted to a rear surface of the selected intermediate shell and fixed to the selected intermediate shell. With reference to the shape of the plug-type optical connector as the mating object, one of the front shells 4, 5, and 6 is selected as the selected front shell. Into an inner opening of the selected front shell, the cylindrical protrusion 2a or 3a of the selected intermediate shell is inserted. Then, the lever of the selected front shell is rotated to engage the groove of the lever with the pin of the selected intermediate shell. Thus, the selected front shell is fixed to the selected intermediate shell.

In the above-mentioned manner, one type of the receptacle-type optical connector is produced. By selecting the other of the intermediate shells 2 and 3 and by selecting another of the front shells 4, 5, and 6, other types of the receptacle-type optical connector can easily be obtained. In other words, it is possible to easily adapt the receptacle-type optical connector to plug-type optical connectors of various shapes.

Referring to FIGS. 2A and 2B, description will be made of a detailed structure of each of the base shell 1 and the intermediate shell 2. Herein, only the intermediate shell 2 is described because the intermediate shell 3 also has a similar detailed structure.

The base shell 1 has a center area provided with a fitting protrusion 1a protruded to be fitted to the intermediate shell 2 or 3 and a core coupling portion 1b protruded at the center to couple a core of the optical fiber.

The intermediate shell 2 is provided with a recess 21 adapted to receive the fitting protrusion 1a of the base shell 1. The recess 21 is provided with a leaf spring 2c as urging means. The leaf spring 2c presses and urges a part of the fitting protrusion 1a in a radial direction of the cylindrical protrusion 2a when the fitting protrusion 1a is fitted to the recess 21. Therefore, it is easy to align optical axes when the base shell 1 and the intermediate shell 2 are coupled with each other. More in detail, the fitting protrusion 1a of the base shell 1 has a pressed portion 1c having a flat surface receiving urging force of the leaf spring 2c. The leaf spring 2c has one end as a fixed end fixed to a wall portion near the recess 21. The leaf spring 2c has the other end as a free end extending into the recess 21 and brought into press contact with the pressed portion 1c. Therefore, even if the intermediate shells 2 and 3 are exchanged, the optical axes can stably and reliably be aligned. Thus, an optical transmission function is highly accurately maintained without causing an unnecessary optical loss.

Referring to FIGS. 3 and 4 in addition, the description will be continued.

The intermediate shell 2 has a protruding pin 2d formed at a predetermined position on a side opposite to the cylindrical protrusion 2a. On the other hand, the base shell 1 is provided with a hole 1d formed at a predetermined position around the fitting protrusion 1a to insert the pin 2d. By inserting the pin 2d into the hole 1d, it is possible to avoid misalignment of the optical axis of the base shell 1 in a rotating direction when the intermediate shell 2 and the base shell 1 are coupled with each other. Therefore, undesired rotation is inhibited with a simple structure so that an optical transmission path is stably assured. Thus, optical communication can be carried out with high accuracy.

The leaf spring 2c has a projecting portion 2e formed at its part near the other end. The projecting portion 2e is a portion to be brought into contact with a part of the pressed portion 1c and to press the pressed portion 1c towards the center of the recess 21.

In the above-mentioned receptacle-type optical connector, the recess 21 preferably is designed into a special shape in order to assure reliable contact between the fitting protrusion 1a of the base shell 1 and the recess 21 of the intermediate shell 2 when the base shell 1 and the intermediate shell 2 are fitted to each other. For example, the recess 21 may be provided with a V-shaped groove formed at a position opposite to the leaf spring 2c so as to assure reliable contact at two points.

Next referring to FIGS. 5 and 6, optical axis misalignment will be described.

Figure 5:
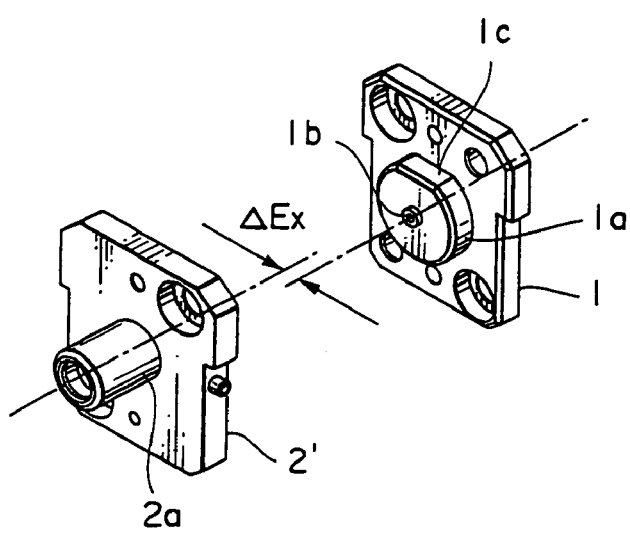
FIG. 5 is a perspective view for describing an advantage of the receptacle-type optical connector illustrated in FIG. 1.
Figure 6:
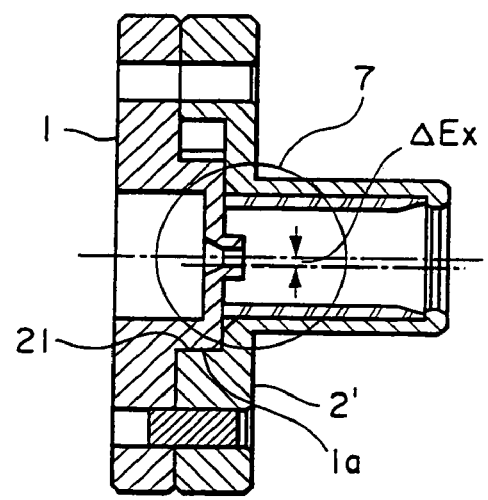
FIG. 6 is a sectional view for describing the advantage of the receptacle-type optical connector illustrated in FIG. 1.

In case where an intermediate shell 2' without the leaf spring for preventing optical axis misalignment is connected to the base shell 1, optical axis misalignment ΔEx is often caused to occur as illustrated in FIG. 5. As illustrated in FIG. 6, after the intermediate shell 2' is connected to the base shell 1, a slight clearance may be present in the recess 21 and a similar optical axis misalignment ΔEx may be caused to occur in an encircled portion 7 in the figure in absence of a positioning function in the radial direction of the cylindrical protrusion 2a.

By designing the special shape of the recess 21 and improving a working accuracy, it is possible to suppress occurrence of the optical axis misalignment ΔEx to some extent. However, in case of a structure without a slight clearance between the recess 21 of the intermediate shell 2' and the fitting protrusion 1a of the base shell 1, it is difficult to easily fit the intermediate shell 2' and the base shell 1 to each other. Therefore, such structure without a slight clearance is unfavorable. In view of the above, it is preferable to provide the leaf spring 2c for preventing optical axis misalignment as illustrated in FIGS. 2A and 3. As the urging means for preventing optical axis misalignment, the leaf spring 2c is simplest and is therefore preferable. However, a spring of any other appropriate type may be used instead.

The above-mentioned receptacle-type optical connector is suitable for an optical communication apparatus particularly required to have a high-accuracy optical transmission characteristic.

While this invention has thus far been described in connection with the preferred embodiment thereof, it will readily be possible for those skilled in the art to put this invention into practice in various other manners without departing from the scope set forth in the appended claims. For example, three or more different types of intermediate shells may be prepared for a single base shell. Simultaneously, three or more different types of front shells may be prepared for a single intermediate shell.

What is claimed is:

1. A method of producing a receptacle-type optical connector to be connected to a plug-type optical connector connected to an optical fiber, said method comprising the steps of:

preparing a base shell having a core coupling portion for coupling a core of said optical fiber;

preparing a first intermediate shell having a cylindrical protrusion shaped in conformity with a fist ferrule having a first dimension and used in termination of said optical fiber;

preparing a second intermediate shell having a cylindrical protrusion shaped in conformity with a second ferrule having a second dimension and used in termination of said optical fiber;

preparing a first front shell having an opening shaped in conformity with a first plug shape of said plug-type optical connector;

preparing a second front shell having an opening shaped in conformity with a second plug shape of said plug-type optical connector;

selecting, as a selected intermediate shell, one from an intermediate shell group including said first and said second intermediate shells with reference to the dimension of a ferrule which is used in said optical fiber connected to said plug-type optical connector;

selecting, as a selected front shell, one from a front shell group including said first and said second front shells with reference to a plug shape of the plug-type optical connector to be connected to said receptacle-type optical connector;

interposing said selected intermediate shell between said base shell and said selected front shell and inserting said cylindrical protrusion into said opening; and fixing said base shell, said selected front shell, and said selected intermediate shell to one another.

2. The method according to claim 1, wherein said front shell group further includes a third front shell having an opening shaped in conformity with a third plug shape of said plug-type optical connector.

3. A method of producing a receptacle-type optical connector to be connected to a plug-type optical connector connected to an optical fiber, said method comprising the steps of:

preparing a base shell having a core coupling portion for coupling a core of said optical fiber;

preparing a plurality of types of intermediate shells having cylindrical protrusions different in diameter from one another;

preparing a plurality of types of front shells having openings different in shape from one another;

selecting one of said intermediate shells as a selected intermediate shell with reference to a dimension of a ferrule which is used in said optical fiber;

selecting one of said front shells as a selected front shell with reference to a plug shape of said plug-type optical;

interposing said selected intermediate shell between said base shell and said selected front shell and inserting said cylindrical protrusion into said opening; and fixing said base shell, said selected front shell, and said selected intermediate shell to one another.

4. The method according to claim 3, wherein said cylindrical protrusions are designed in conformity with ferrules of different diameters used in termination of said optical fiber, said openings being designed in conformity with different plug shapes of said plug-type optical connector.

* * * * *